United States Patent Office 2,799,673
Patented July 16, 1957

2,799,673
NEW MONOAZO-DYESTUFFS

Hans Bolliger, Basel, Switzerland, assignor to Ciba Limited, Basel, Switzerland, a Swiss firm No Drawing. Application December 13, 1954,
Serial No. 474,967

Claims priority, application Switzerland
December 15, 1953

6 Claims. (Cl. 260—163)

This invention provides valuable new monoazo-dyestuffs, which contain a sulfonic acid amide group to the nitrogen atom of which is bound through a —CO— group an alkyl group containing a halogen atom.

The said halogen atom may be present in a β-position, but advantageously in an α-position, of the aliphatic radical which is bound through a —CO— group to the nitrogen atom of the sulfonic acid amide group. The said nitrogen atom may contain as a further substituent an aliphatic, cycloaliphatic, araliphatic or aromatic radical. Especially valuable are those dyestuffs which contain at least one sulfonic acid amide group of the formula (1) 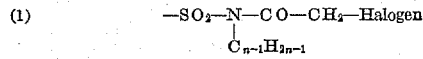

in which $n$ represents a whole number, preferably one.

In addition to a group of the latter kind of dyestuffs of this invention may contain further substitutents usual in monoazo-dyestuffs, such as additional groups imparting solubility, for example, an —SO₂NH₂ group, a sulfone group such as a methyl sulfone group, a carboxylic acid or sulfonic acid group, or substitutents which do not impart solubility, such as halogen atoms or nitro, acylamino, alkyl or alkoxy groups.

The invention also includes a process for making the aforesaid dyestuffs, wherein there is introduced into the sulfonic acid amide group of a monoazo-dyestuff containing such a group an acyl radical which contains a halogen atom, and especially a chlorine atom. For this purpose a dyestuff containing a sulfonic acid amide group, which contains at least one hydrogen atom, may be treated with an acylating agent capable of introducing the radical of an aliphatic halogen-carboxylic acid, for example, with a halide or anhydride of an aliphatic carboxylic acid containing a chlorine atom advantageously in the β- or α-position, for instance, an aliphatic α- or β-chlorocarboxylic acid halide, so that the sulfonic acid amide group is converted, for example, into a group of the Formula 1 above.

As aliphatic carboxylic acid halides or anhydrides there may be mentioned α- or β-chloropropionic acid chloride, bromacetyl bromide and chloroacetyl chloride, and also the corresponding halogen-alkyl-carboxylic anhydrides.

The starting materials containing a sulfonic acid amide group can be made by the usual methods, for example, by coupling together the following diazo compounds and coupling components:

(A) Components containing sulfonic acid amide groups, such as diazo-compounds of 1-aminobenzene-2- or -3- or -4-sulfonic acid amide, 1-aminobenzene-2- or -3- or -4-sulfonic acid methylamide, ethylamide, butylamide, hexylamide or phenylamide, 4-methyl-1-amino-benzene-2- or -3-sulfonic acid amide, 2-methoxy-1-amino-benzene-3- or -4- or -5-sulfonic acid amide or 2-amino-napthalene-6-sulfonic acid amide and coupling components such as 2-amino- or 2-hydroxynaphthalene-6-sulfonic acid amide and pyrazolones, especially 3-methyl-5-pyrazolones such as 1-(α-napththyl)-3-methyl-5-pyrazolone-4'-sulfonic acid amide, 1-phenyl-3-methyl-5-pyrazolones-2'- or -3'- or -4'-sulfonic acid amide, 1-phenyl-3-methyl-5-pyrazolone-2'- or -3'- or -4'-sulfonic acid methylamide or 1-phenyl-3-methyl-5-pyrazolone-2'-chloro-5'-sulfonic acid amide.

(B) Components free from sulfonic acid amide groups, which are to be combined with components mentioned under (A), such as diazo-compounds of aniline, ortho- or meta- or para-chloraniline, 2:5-dichloro-1-aminobenzene, nitranilines, toluidines and also 1-aminobenezene-3- or -4-methyl sulfone, 1-aminobenzene-3- or -4-sulfonic acid amide, 1-aminobenzene-3- or -4-sulfonic acid or 1-amino-2-hydroxynaphthalene-4-sulfonic acid and coupling components especially pyrazolones such as 1-phenyl-3-methyl-5-pyrazolone, 1-(2'- or 3'- or 4'-chlorophenyl)-3-methyl-5-pyrazolone, 1-(4'-nitrophenyl)-3-methyl-5-pyrazolone, 1-phenyl-3-methyl-5-pyrazolone-3'- or -4'-sulfonic acid or 1-phenyl-5-pyrazolone-3-carboxylic acid.

Some of the monoazo-dyestuffs are known which are obtainable by coupling a diazo compound specified under (B) with a coupling component specified under (A) or above all by coupling a diazo compound specified under (A) with a coupling component specified under (A) or (B), in an alkaline, neutral or acid medium.

The dyestuffs containing a sulfonic acid amide group, and obtainable as described above, may be reacted with the aforesaid aliphatic halogen-carboxylic acid halides or anhydrides in an anhydrous inert solvent such as dioxane tetrahydrofurane, toleuene, xylene, benzene, methyl ethyl ketone, ethyl acetate or the like, or in an aqueous medium, advantageously in the presence of a tertiary organic base such as pyridine, or in the presence of an alkali.

It is of advantage to use an excess of the acid halide or anhydride, that is to say, to use a proportion of an acid halide greater than is necessary to react with the acylatable sulfonic acid amide groups of the dyestuff present in the reaction mixture.

After the reaction, the new dyestuffs may be isolated, for example, by salting out from the reaction medium and filtration.

The dyestuffs so obtained are new. They are monoazo-dyestuffs, preferably of the pyrazolone series, which contain a sulfonic acid amide group of the formula (2) 

in which X represents a hydrogen atom or a hydrocarbon radical, and B represents an aliphatic radical, which contains a halogen atom, advantageously a chlorine atom, in the β- or α-position, provided that, when X represents a hydrocarbon radical, the dyestuff must contain a group imparting solubility, advantageously a sulfonic acid group.

The new dyestuffs can be used for dyeing or printing a very wide variety of materials, especially nitrogenous natural or artificial fibers, such as leather, silk, wool, or structures of superpolyamides or superpolyurethanes. They can be used for dyeing from weakly acid, neutral to weakly alkaline baths. The dyeings so obtained are level and are distinguished by their good fastness to light and their excellent fastness to washing, fulling and alkali.

As compared with the comparable dyestuffs known hitherto, which contain an acylated sulfonic acid amide group, the dyestuffs of this invention possess a much better fastness to washing.

The following examples illustrate the invention, the parts and percentages being by weight unless otherwise stated and the relationship of parts by weight to parts by volume being the same as that of the kilogram to the liter:

Example 1

39.2 parts of the dyestuff obtained in the usual manner from 1-(2'-chlorophenyl)-3-methyl-5-pyrazolone and diazotized 1-aminobenzene-3-sulfonic acid amide are dissolved in 200 parts of dioxane with the addition of 50 parts by volume of a sodium hydroxide solution of 30 percent strength. After cooling the mixture to $+5°$ C., there is introduced dropwise in the course of ½ hour a solution of 22.6 parts of chloracetyl chloride in 50 parts of dioxane. When the addition is complete, the pH value is adjusted to 5–6 by the addition of a small amount of acetic acid. After the addition of 500 parts of water the whole is heated to 50° C., and the clear solution is mixed, while stirring, with 100 parts of sodium chloride. By filtering off the precipitated product, washing it with sodium chloride solution of 10 percent strength and drying it at about 60° C. in vacuo, there is obtained the dyestuff of the formula

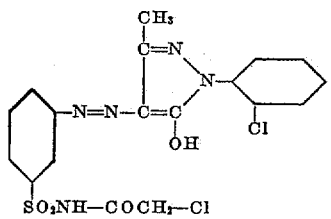

in the form of a red-yellow powder. It dissolves in water with a yellow coloration, and dyes wool from a neutral to weakly acid bath pure yellow tints of excellent fastness to washing, fulling and light.

Similar dyestuffs are obtained by using any one of the dyestuffs of the following formulae, and otherwise proceeding in an analogous manner:

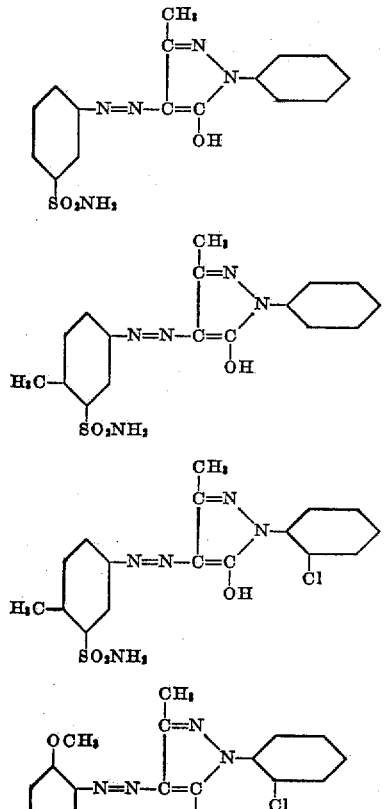

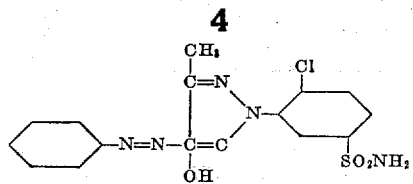

Example 2

32.6 parts of the dyestuff obtained in the usual manner from 2-aminonaphthalene-6-sulfonic acid amide and diazotized aminobenzene are aftertreated in dioxane with chloracetyl chloride and caustic soda solution of 30 percent strength according to Example 1. The dyestuff of the formula

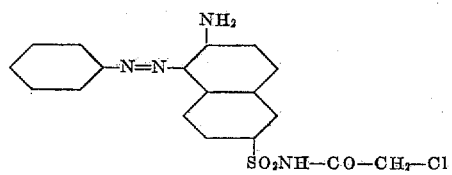

is obtained as a pale red powder which dissolves in water to give an orange coloration and dyes wool from a neutral, to weakly acid bath orange tints of excellent fastness to washing and fulling.

Example 3

40.6 parts of the dyestuff obtained in the usual manner from 2-hydroxynaphthalene-6-sulfonic acid amide and diozotized 3-amino-benzene sulfonic acid amide are treated in 300 parts of dioxane with 100 parts of potassium hydroxide of 56 percent strength and 60 parts of chloracetyl chloride. After working up in the manner described in Example 1 there is obtained the dyestuff of the formula

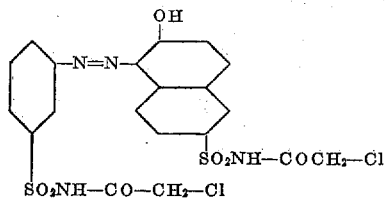

in the form of a red powder. The new dyestuff dissolves in water with a yellow-red coloration and dyes wool from a neutral to weakly acid bath orange tints of excellent fastness to washing and fulling.

Example 4

0.6 part of the dyestuff obtained as described in the first paragraph of Example 1 is dissolved in 300 parts of water, 10 parts of crystalline sodium sulfate are added, and 100 parts of well wetted wool are entered at 40–50° C. into the dyebath so prepared. After the addition of 2 parts of acetic acid of 40 percent strength, the bath is raised to the boil in the course of ½ hour, and dyeing is continued at the boil for ¾ hour. The wool is then rinsed in cold water and dried. There is obtained a level, pure yellow dyeing of excellent fastness to washing, fulling and light.

A uniform yellow dyeing of similar fastness is obtained by the same procedure, but without the addition of acetic acid to the dyebath.

What is claimed is:
1. A pyrazolone dyestuff of the formula

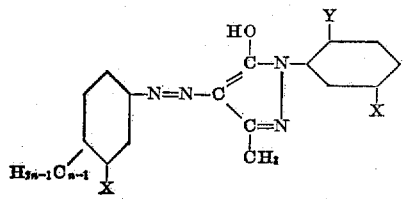

wherein n represents a whole number which is at most 2, Y represents a member selected from the group consisting of a hydrogen and a chlorine atom, one X represents a hydrogen atom and the other X the sulfonic acid amide group of the formula

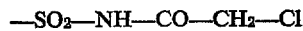

2. The dyestuff of the formula

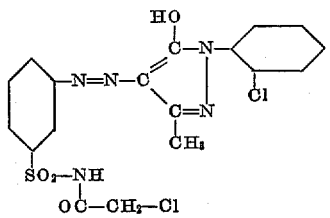

3. The dyestuff of the formula

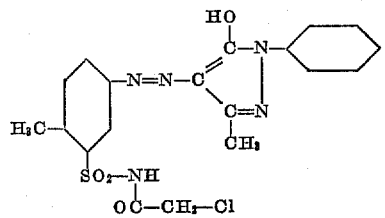

4. The dyestuff of the formula

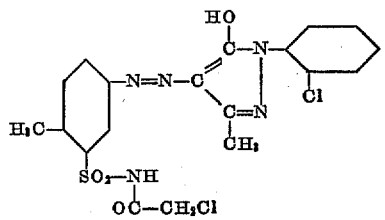

5. The dyestuff of the formula

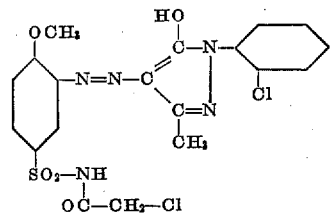

6. The dyestuff of the formula

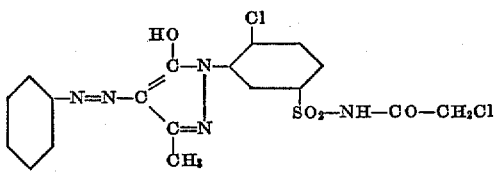

References Cited in the file of this patent
UNITED STATES PATENTS

| | | |
|---|---|---|
| 2,173,056 | Hitch et al. | Sept. 12, 1939 |
| 2,353,569 | Knecht et al. | July 11, 1944 |

UNITED STATES PATENT OFFICE

Certificate of Correction

Patent No. 2,799,673

July 16, 1957

Hans Bolliger

It is hereby certified that error appears in the printed specification of the above numbered patent requiring correction and that the said Letters Patent should read as corrected below.

Column 1, line 33, for "of", second occurrence, read —the—; column 2, line 3, for "1-(α-napththyl)-" read — 1-(α-napthyl)- —; line 31, for "toleuene," read —toluene,—; column 4, lines 1 to 7, Example 1, the formula should appear as shown below instead of as in the patent—

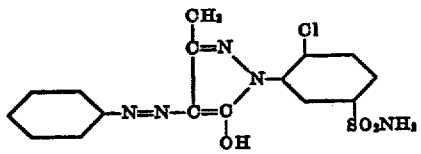

line 30, for "diozotized" read —diazotized—.

Signed and sealed this 1st day of October 1957.

[SEAL]

Attest:
KARL H. AXLINE,
*Attesting Officer.*

ROBERT C. WATSON,
*Commissioner of Patents.*